United States Patent
Duffy

[11] Patent Number: 5,165,702
[45] Date of Patent: Nov. 24, 1992

[54] SEAL RING ASSEMBLY FOR HIGH PRESSURE VALVES

[75] Inventor: James J. Duffy, Livonia, Mich.

[73] Assignee: Ford Motor Company, Dearborn, Mich.

[21] Appl. No.: 703,302

[22] Filed: May 20, 1991

[51] Int. Cl.⁵ ............................................. F16J 15/16
[52] U.S. Cl. .................................. 277/143; 277/175; 277/176
[58] Field of Search ............... 277/138, 143, 144, 145, 277/170, 176, 175; 180/142, 132, 143; 91/375 A

[56] References Cited

U.S. PATENT DOCUMENTS

| | | | |
|---|---|---|---|
| 1,479,089 | 1/1924 | Short | 277/143 |
| 1,556,312 | 10/1925 | Davis | 277/143 |
| 1,640,155 | 8/1927 | Low . | |
| 1,649,474 | 11/1927 | Johnston et al. | 277/143 X |
| 1,735,596 | 11/1929 | Bowman . | |
| 1,775,648 | 9/1930 | Lyman | 277/143 |
| 2,263,454 | 11/1941 | Clade . | |
| 2,313,395 | 3/1943 | Phillips . | |
| 2,855,254 | 10/1958 | Beck et al. | 277/143 |
| 2,962,331 | 11/1960 | Folkerts . | |
| 3,023,014 | 2/1962 | Donner . | |
| 3,109,661 | 11/1963 | Swaim et al. | 277/143 X |
| 3,586,289 | 11/1969 | Priese . | |
| 4,252,331 | 2/1981 | Siegel . | |
| 4,570,735 | 2/1986 | Duffy | 180/142 |
| 4,793,433 | 12/1988 | Emori et al. | 180/143 |
| 4,911,455 | 3/1990 | Edlund | 277/165 |
| 4,953,876 | 9/1990 | Müller | 277/165 |

FOREIGN PATENT DOCUMENTS

| | | | |
|---|---|---|---|
| 2432181 | 1/1976 | Fed. Rep. of Germany | 277/165 |
| 910655 | 6/1946 | France | 277/176 |

Primary Examiner—William A. Cuchlinski, Jr.
Assistant Examiner—Scott W. Cummings
Attorney, Agent, or Firm—Roger L. May; Raymond L. Coppiellie

[57] ABSTRACT

A seal ring located in a seal ring groove of a valve member of a rotary valve assembly has an outer seal surface in sealing engagement with a surrounding valve housing and is adapted to isolate pressure passages communicating with the valve assembly regardless of the direction of the pressure differential across the seal ring, the seal ring being maintained in sealing engagement with one wall of the seal ring groove and with a surrounding wall of the valve housing by an underseal expander ring that assures continuous sealing action of the seal ring.

8 Claims, 4 Drawing Sheets

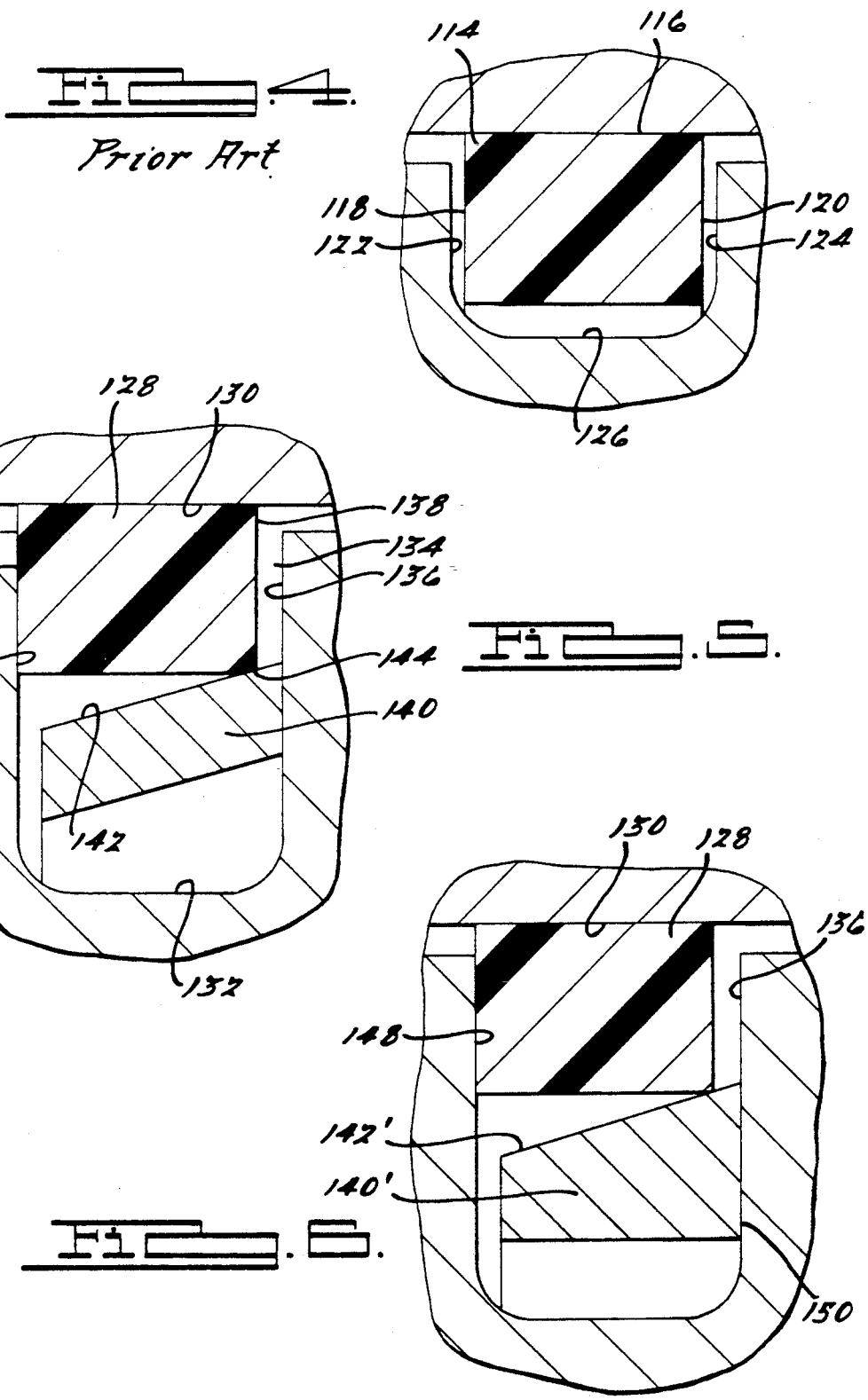

SEAL RING ASSEMBLY FOR HIGH PRESSURE VALVES

BACKGROUND OF THE INVENTION

My invention is adapted particularly for use in a rotary valve assembly of a power steering mechanism of the kind disclosed in my U.S. Pat. No. 4,570,736, which is assigned to the assignee of my invention. The mechanism disclosed in the '736 patent includes a rotary valve assembly comprising an inner rotary valve member and an outer valve sleeve. The valve sleeve is surrounded by a valve housing. A high pressure port in the valve housing communicates with a high pressure valve groove in the valve sleeve. Internal valve lands in the valve sleeve register with external valve lands on the inner valve member to control pressure distribution to each of two pressure ports in the valve sleeve, which communicate with opposite sides of a pressure operated piston of a fluid motor that provides the power assist for a steering gear. One port is pressurized relative to the other to effect a right turn. The pressure differential is reversed to effect a left turn. The right turn port and the left turn port are sealed from the high pressure supply port by a seal ring, which sealingly engages the valve housing. The seal rings are located on each side of the pressure port in the valve sleeve.

The steering mechanism of the '736 patent includes also a high speed pressure port that is pressurized when the vehicle speed exceeds a calibrated value. At low speeds, that pressure port is de-pressurized. The seal between the high speed port and the adjacent twin port will be subjected to a differential pressure in one axial direction at low speeds and in the opposite direction at high speeds. There is a tendency, therefore for the seal ring to shift under the influence of an increasing pressure in either the left turn passage or the right turn passage. The seal ring thus is incapable of preventing leakage flow across the seal ring through the clearance spaces between the seal ring and the seal ring groove in which it is situated. It is recent design practice to try to minimize leakage flow by providing a close tolerance fit between the seal rings and the grooves. This effectiveness in reducing leakage in this manner, however, is not satisfactory. Also, the close tolerances that are required increase the manufacturing cost.

The sealing action of such known designs is even more imprecise if the coefficient of thermal expansion of the seal material and the groove material are not approximately equal.

This leakage flow reduces the responsiveness of the steering gear mechanism as steering torque is applied to the inner valve member. It also makes it necessary to provide flow compensation to effect turning maneuvers of the vehicle, thus requiring the use of a power steering pump of increased capacity which, in turn, increases the total parasitic power loss for the vehicle engine.

I am aware of prior art teachings that deal with means for preloading seal rings on reciprocating members such as a piston or reciprocating valve elements. These seal rings usually comprise an inner spring member that acts radially outwardly on a seal ring to establish sealing contact between the reciprocating member and the surrounding cylinder. Examples of piston packings having internal springs for establishing a sealing force on the piston rings may be seen by referring to U.S. Pat. Nos. 1,640,155 and 1,735,596.

I am aware also of reciprocating piston seals for use in power steering gears, but these are used to establish a seal for a piston of the fluid motor used to obtain power assist. An example of this application of a piston ring seal with an internal spring for effecting sealing engagement of the seal with respect to the cylinder is shown in U.S. Pat. No. 2,962,331, where an inner spring located in a seal ring groove acts on a surrounding O-ring to urge the O-ring into sealing engagement with the surrounding cylinder member of the fluid motor for the steering gear.

U.S. Pat. No. 4,793,433 shows an application similar to that of the seal disclosed in the '331 patent. It comprises a Teflon ring and an O-ring fitted in an annular groove in such a way that the Teflon ring exerts a radial force on the O-ring to establish sealing engagement with the surrounding cylinder wall.

None of these seal assemblies of the prior art mechanisms is capable of establishing fluid pressure isolation of a pressure port, such as the high speed pressure disclosed in the '736 patent, and adjacent pressure delivery ports in a rotary valve mechanism wherein the pressure balance across the seal ring is subject to change upon rotary adjustment of the inner member of the rotary valve with respect to the valve sleeve.

BRIEF DESCRIPTION OF THE INVENTION

My improved seal assembly comprises a seal ring of generally rectangular cross-section in which the radially outward surface of the ring is in sealing engagement with a surrounding housing and wherein the radial dimension of the seal ring is less than the axial width of the outward sealing surface. The seal ring is situated in a seal ring groove located in the sleeve of the rotary valve assembly with a clearance on each axial side of the seal ring. A steel underseal expander ring located within the seal ring groove under the seal ring is provided with an outer conical surface which engages one axial end of the seal ring and establishes an axially directed force component on the seal ring, thereby effecting sealing engagement of a side surface of the seal ring on the opposite side of the seal ring groove. Thus, sealing engagement is effected at the interface of the seal ring groove and the seal ring as well as between the surrounding housing and the outward sealing surface of the seal ring. Leakage across the seal assembly thus is prevented.

Because leakage does not occur across my improved seal assembly, pressure forces acting on the seal ring in an axial direction will complement the axial force applied to the seal ring by the steel underseal expander ring. Pressure forces also maintain a sealing engagement between the outward peripheral surface of the seal ring and the surrounding housing wall. Relative motion, therefore, will occur between the seal ring and the adjacent wall of the seal ring groove, rather than between the seal ring and the surrounding housing, upon rotary motion of the valve sleeve with respect to the housing. Thus, wear of the surrounding wall of the housing at the seal ring and housing interface will not occur.

Figure 1:
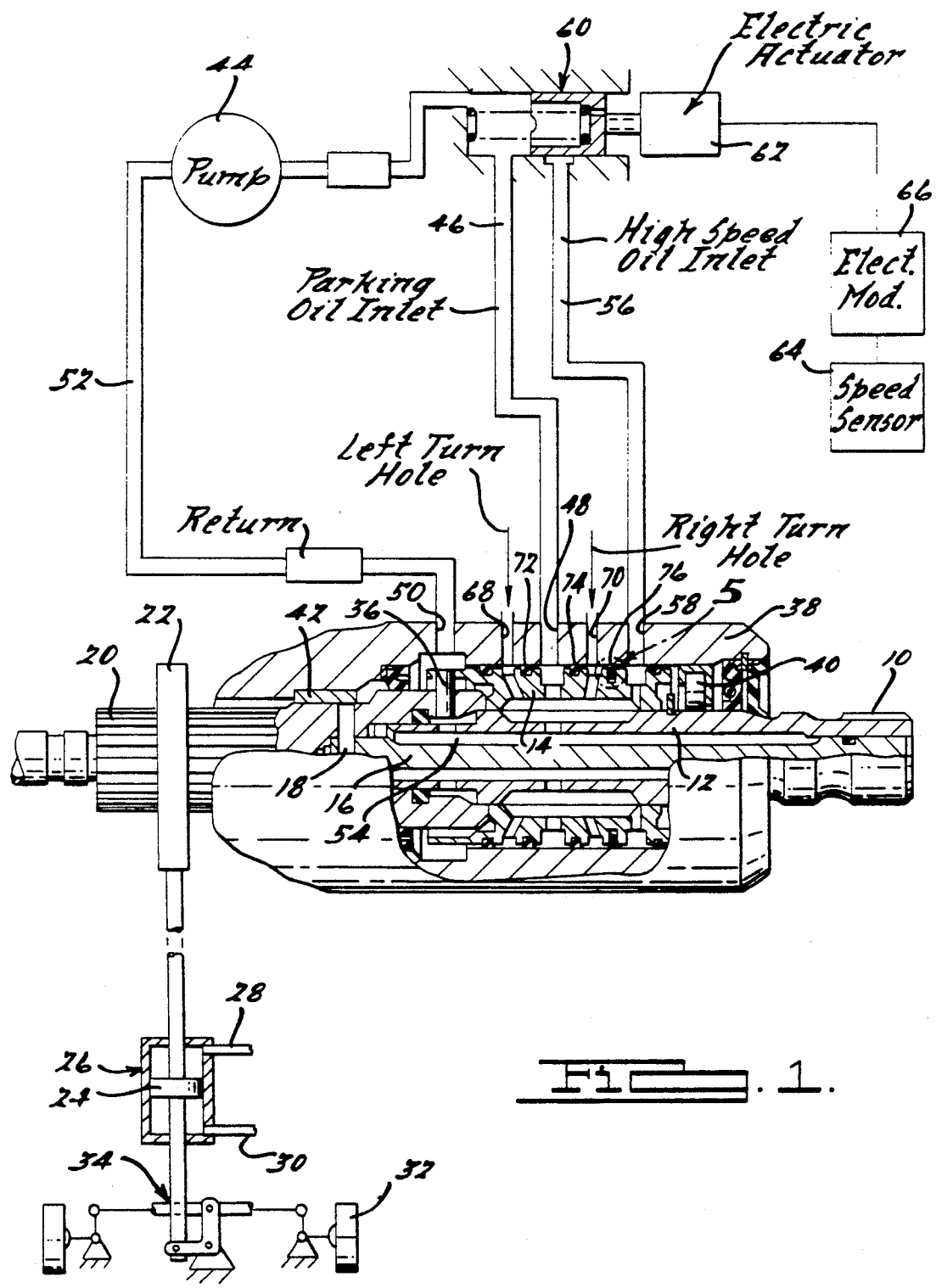
FIG. 1 is a cross-sectional assembly view of a steering valve comprising a rotary inner valve member and an outer valve member located in a valve housing wherein the improved seal of our invention is located between
} the periphery of the valve sleeve and the surrounding valve housing.
Figure 2:
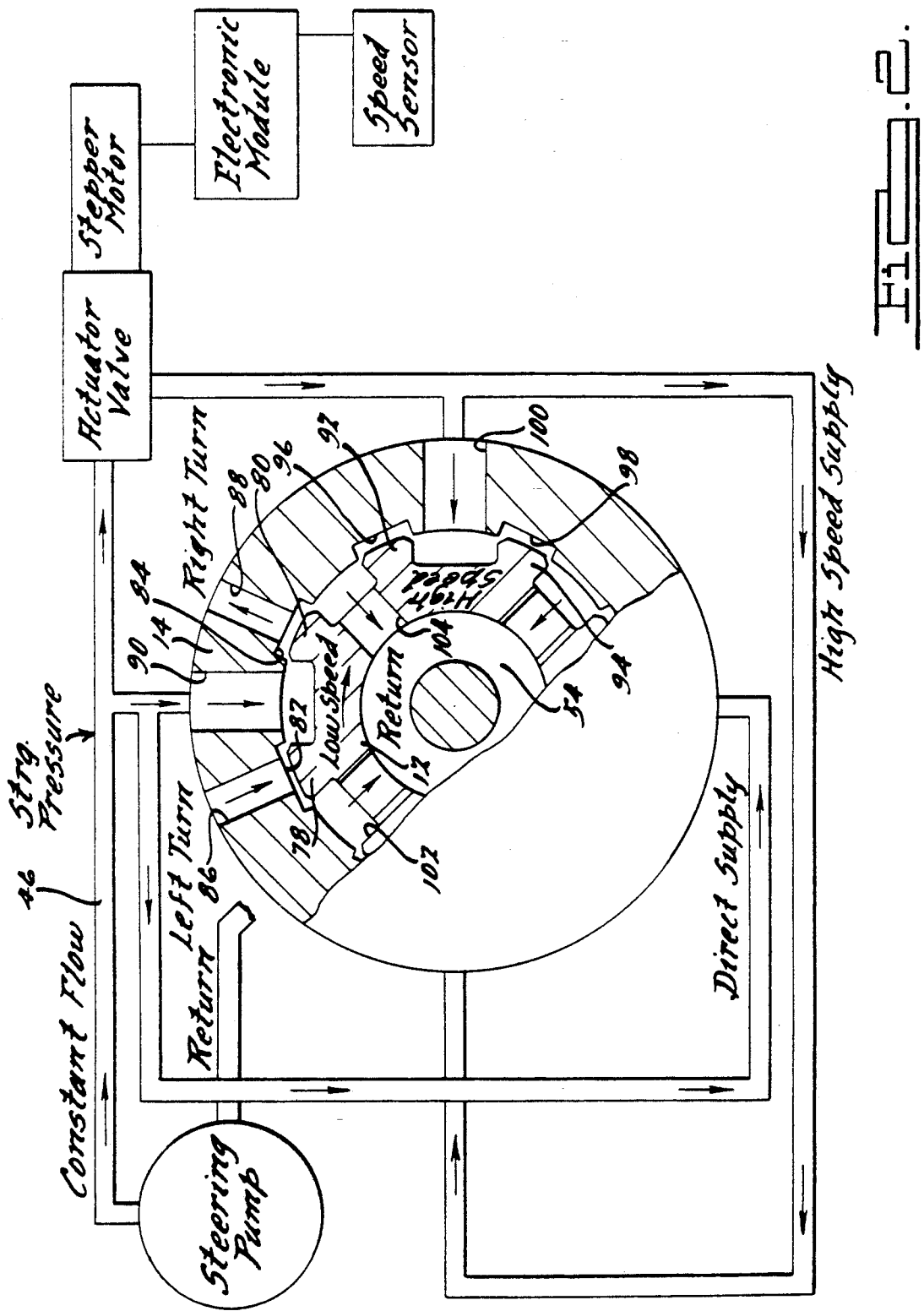
Figure 7:
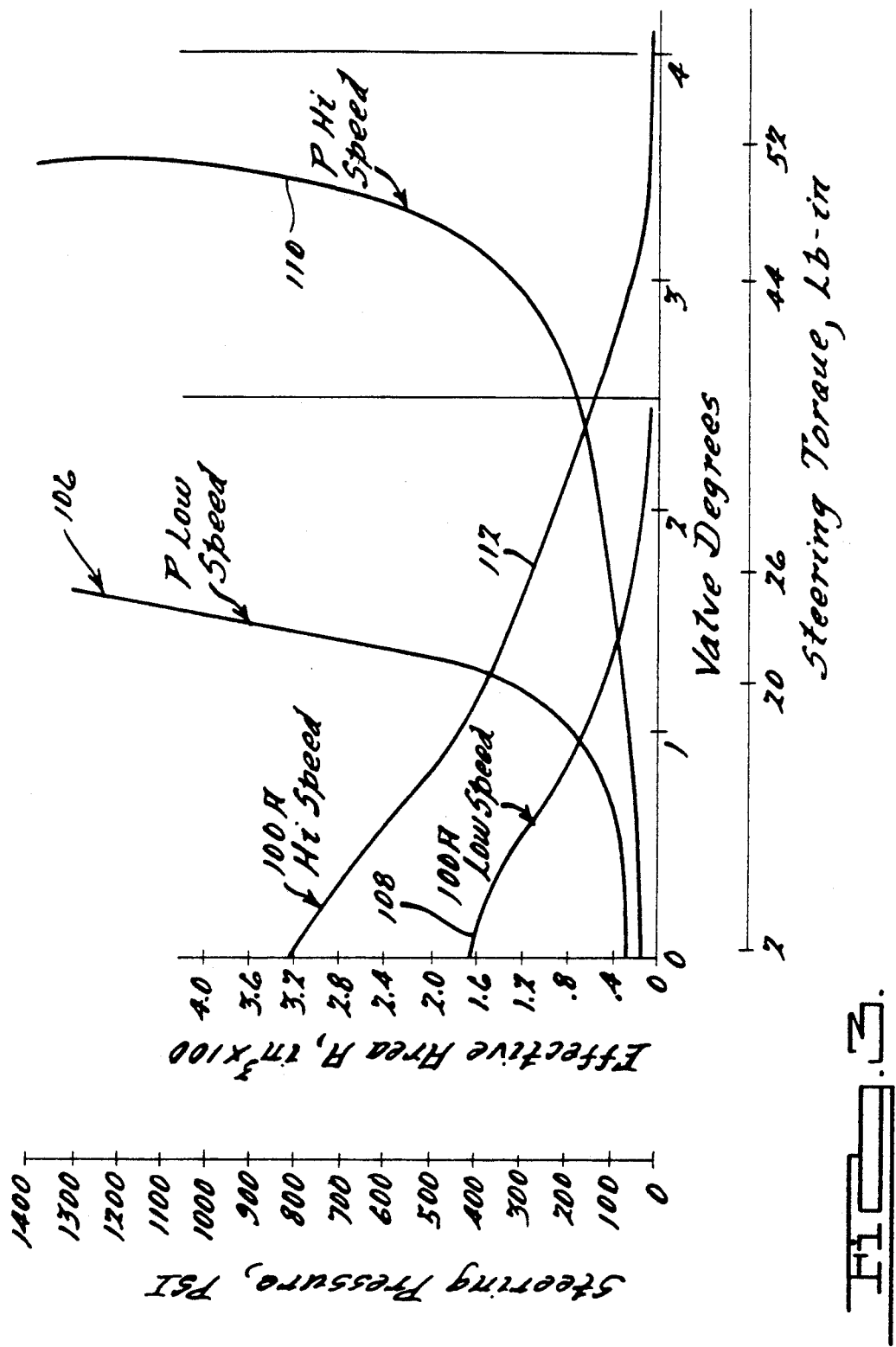

FIG. 2 is a schematic view showing a cross-section of the valve assembly of FIG. 1.

FIG. 3 is a chart showing the relationship between steering torque applied to the valve sleeve of FIG. 1 and both steering pressure and effective valve metering area.

FIG. 4 is an illustration of a prior art valve seal design for a rotary valve mechanism of the kind shown in FIG. 1.

FIG. 5 is a cross-sectional assembly view of my improved seal ring assembly.

FIG. 6 shows a modification of the seal ring of my invention, which includes a seal ring expander ring of enhanced radial depth.

PARTICULAR DESCRIPTION OF THE INVENTION

FIG. 1 shows a rotary steering valve for use in a power steering system. It is similar to the valve that is disclosed in U.S. Pat. No. 4,570,736. It is adapted to accommodate the improved seal assembly of my present invention.

In the steering gear shown in FIG. 1, a driver controlled steering shaft is splined at 10 to one end of an inner rotary valve element 12, which is rotatably situated within a valve sleeve 14. Valve element 12 is provided with a central opening through which torsion bar 16 extends. The right-hand end of the torsion bar 16 is secured to the right-hand end of the valve element 12 and is pinned at 18 to a steering drive pinion 20, which engages a steering gear rack 22, the latter being mechanically connected to piston 24 of a fluid motor indicated generally by reference numeral 26. The fluid motor 26 comprises a pressure working chamber on each side of the piston 24, one chamber being supplied with pressure through passage 28 and the opposite pressure chamber being supplied with pressure through passage 30.

In a left-turn steering maneuver, passage 58 is pressurized and the pressure in passage 60 is reduced. During a right-turn steering maneuver, passage 30 is pressurized relative to the pressure in passage 28.

Piston 24 is mechanically connected to traction wheels 32 through a suitable steering linkage mechanism 34.

Pinion 20 is connected by means of a drive pin 36 to the sleeve 14 so that rotary movement of the pinion 20 will be accompanied by corresponding rotary movement of the sleeve 14. Torque applied to the steering shaft will result in rotary adjustment of the inner valve element 12 as the torsion bar 16 deflects. The torque applied to the torsion bar 16 is distributed directly to the pinion 20.

Inner valve member 12 is journalled in housing 38 by means of bushing 40. Pinion 20 is journalled in housing 28 by bushing 42.

Pressure is supplied to the rotary valve by power steering pump 44. A pressure passage 46 establishes fluid communication between the high pressure side of the pump 44 and inlet port 48 of the housing 38. A return flow port 50 in the housing 38 communicates with the inlet side of the pump 44 through return passage 52. Port 50 communicates with the interior 54 of the inner valve element 12.

The pump 44 is a positive displacement pump with a flow control valve that carries a constant pressure fluid delivery regardless of pump speed.

An auxiliary high pressure feed passage 56 extends to pressure inlet port 58 in the housing 38. Passage 56 is supplied with pressure from the pump 44 by flow control valve 60 when the speed of the vehicle exceeds a predetermined value. This function is described in U.S. Pat. No. 4,570,736. At low speeds, valve 60 blocks fluid communication between the discharge side of the pump 44 and the feed passage 56. The valve 60 is actuated by an electronic actuator, preferably in the form of a stepper motor 62. Actuator 62 is sensitive to the speed of the vehicle as measured by a speed sensor 64 which delivers a signal to an electronic control module 66 which, in turn, supplies actuating voltage to the actuator 62 to control movement of the valve 60 to a flow bypass position at high vehicle speeds. The high speed position for the valve 60 is the right-hand position. When it assumes that position, fluid is supplied to both passages 46 and 56.

The rotary valve assembly distributes pressurized fluid to the left-turn pressure passage 58 through left-turn port 68. It delivers pressurized fluid to the right-turn pressure passage 30 through port 70. At low vehicle speeds, passage 56 has a gage pressure of zero because distribution of fluid from the pump 44 to the passage 56 is interrupted by the valve 60. At high vehicle speeds passage 56 is pressurized.

The passage 46 and the inlet port 48 are sealed with respect to the ports 68 and 70 by fluid seals 72 and 74, respectively. Similarly, passage 56 is sealed with respect to the port 60 by seal 76. Because the pressure in passage 46 is either equal to or greater than the pressure that exists in passages 28 and 30, the pressure differential across the seals 72 and 74 will continuously create a force acting in a single direction. On the other hand, the pressure in passage 56 can be either greater or less than the pressure in port 70 and passage 30. Thus, it is possible for the direction of the pressure differential across the seal 76 to shift so that a pressure force will occur either in one direction or the other depending upon whether passage 56 is pressurized by the pump 44. The pressure sealing requirements for the seal 76, therefore, are substantially different than the sealing requirements for the seals 72 and 74. The improved seal assembly of my invention, therefore, is used at the location occupied by the seal 76 in FIG. 1.

In order to describe the mode of operation of the rotary valve and the geometry of the valve flow control lands of the valve elements, reference will be made to FIG. 2. The inner valve element 12, as seen in FIG. 2, consists of a plurality of external valve lands including external lands 78 and 80. These register, respectively, with internal lands formed in the valve sleeve 14, as shown at 82 and 84, respectively. Valve port 68 communicates with valve passage 86 in valve sleeve 14, the valve lands 82 registering with the passage 86. Similarly, valve passage 88 communicates with right-turn port 70 and extends to the space between valve lands 84. A main pressure supply passage 90 is formed in the valve sleeve 14 and communicates with the supply passage 46. The passage 90 is located between the external valve lands 78 and 80 of the inner valve element 12.

Another pair of external valve lands 92 and 94 formed on the inner valve element 12 registers with internal valve lands 96 and 98, respectively, formed in the sleeve 14. Valve passage 100 in the valve sleeve 14 communicates with port 58 which, as explained previously, communicates with the high-speed pressure supply passage 56. Valve passage 100 communicates with a space between external valve lands 92 and 94, as shown in FIG. 2.

When no torque is applied to the steering shaft, the internal valve element 12 assumes the neutral position shown in FIG. 2. In that steering mode, flow occurs from passage 90 across the registering valve lands 78 and 82 into radial passage 102, which communicates with the central passage 54 of the inner valve element 12. Passage 54 serves as a flow return passage, as explained previously. Similarly, fluid passes through registering valve lands 80 and 84 and enters radial passage 104 into the central passage 54.

If steering torque is applied to the inner valve member in a clockwise direction as viewed in FIG. 2, communication between passage 90 and passage 88 leading to the right turn passage 30 is increased while communication between passage 90 and passage 86 communicating with the left-turn passage 28 is decreased. This creates a steering assist in a right-hand direction. If steering torque is applied to the inner valve member 12 in the opposite direction, the steering assist will be in a left-turn direction.

If the vehicle speed is less than the speed that will trigger the operation of the bypass flow valve 60, the pressure and torque relationship will appear, as shown by the curve 106 in FIG. 3. As the pressure increases upon an increase in torque applied to the steering shaft, the flow area across the registering valve lands will decrease as shown by the low-speed curve 108.

If the steering maneuver should occur at a high speed, pressurized fluid will be distributed by the valve 60 to the passage 56. The total flow area then is increased. This increase is due to the action of the external valve lands 92 and 94 with respect to the cooperating internal valve lands 96 and 98. This changes the flow area for the pressurized fluid for any given value of steering torque. The resultant characteristic curve for the steering pressure as a function of steering torque then is represented by the curve 110 in FIG. 3. The corresponding high speed area relationship with respect to the steering torque is represented by the curve 112 in FIG. 3.

It is apparent from the foregoing description that the pressure differential across seal 76 during high speed turning maneuvers will create a pressure force acting in a left-hand direction when the pressure in the right-turn port 70 is less than the pressure in the left-turn port 68. On the other hand, a steering maneuver in the low speed steering mode will result in a pressure differential on the seal 76 that tends to create a force acting in a right-hand direction. That is because the pressure in passage 56 at that time is substantially zero compared to the steering pressures in passage 46. This condition creates a sealing problem which will be explained with reference to the prior art seal design illustrated in FIG. 4.

In FIG. 4, I have shown a conventional seal ring 114, which is of rectangular cross-section. It includes a sealing surface 116 and two side sealing surfaces 118 and 120 located adjacent the cooperating walls 122 and 124 of a seal ring groove 126. As illustrated in FIG. 4, a gap normally exists between the side sealing surfaces, such as that shown at 118 and 120, and the adjacent surfaces on the walls of the seal ring groove. For purposes of this description, the size of the gap has been exaggerated. If the pressure on the right-hand side of the seal ring 114 is greater than the pressure on the left-hand side, leakage flow will tend to occur through the space adjacent the sealing surface 120, the space at the radially inward region of the seal ring groove 126 and the space adjacent the sealing surface 118. Such leakage would tend to occur until the seal ring shifts in a left-hand direction under the influence of the pressure differential across it. Similarly, when the pressure on the left side of the seal ring 114 is higher than the pressure on the right side, the seal ring will tend to shift in a right-hand direction during the transition from the left side to the right side of the seal ring groove 126, and leakage would tend to occur as before.

This underseal leakage is avoided by the improved seal design of my invention. That seal design is shown in particular detail in FIG. 5. My improved seal assembly includes a seal ring which is generally rectangular in cross-section with a greater width than depth. A radially outward sealing surface 130 sealingly engages a cylindrical wall of the housing that surrounds the rotary valve assembly.

A seal ring groove 132 receives the seal ring 128. It is slightly greater in width than the width of the seal ring 128, thus creating a clearance space 134 between the wall 136 of the groove 132 and the adjacent sealing surface 138 of the seal ring 128.

In the construction shown in FIG. 5, the seal ring 128 is urged in a left-hand direction, even in the absence of pressure forces acting on it, by a steel underseal expander ring 140 which is formed with a conical outer surface 142 engageable with the right-hand corner 144 on the inner surface of the seal ring 128. The expander ring creates a radially outward preload on the seal ring which establishes a force component in an axial direction. This tends to urge the seal ring surface 146 into sealing engagement with the seal ring groove wall 148.

If the pressure on the right-hand side of the seal ring 128 is higher than the pressure on the left-hand side, leakage flow through the clearance space 134 and through the space in the seal ring groove below the seal ring 128 will not occur because of the sealing effect established by reason of the contact between the corner 144 of the seal ring 128 and the conical surface 142 of the expander ring 140. If the pressure on the left side of the seal ring 128 increases relative to the pressure on the right-hand side, the expander ring 140 will be compressed because of the camming action between the edge 144 of the seal ring 128 and the conical surface 142. As the seal ring 128 is shifted to the right, sealing engagement will occur between the sealing surface 138 and the adjacent surface 136 of the seal ring groove. During the transition from the left side of the seal ring groove to the right side, leakage will not occur because of the sealing effect at the edge 144.

The expander ring 140 at all times will be maintained at the right-hand side of the groove in sealing engagement with the surface 136 of the seal ring groove, thereby preventing the bypassing of fluid around the expander ring.

The expander ring has a gap to permit a slight degree of radial expansion and contraction. This gap is small enough to permit a pressure buildup to occur in the radially inward portion of the seal ring groove, thereby creating a pressure force on the inner surface of the seal ring to maintain sealing engagement between the outer surface of the seal ring and the surrounding surface 130 of the housing.

The cone angle for the surface 142 should be sufficiently acute to create a force component in a left-hand direction that will assure that the seal ring 128 will seal against the surface 148 under a zero pressure differential condition. On the other hand, the angle of the cone surface 142 should not be too large to permit the seal ring 128 to shift in the right-hand direction when the pressure on the left side of the ring 128 exceeds the pressure on the right-hand side. I have found that an appropriate angle that will satisfy both of these conditions is about 15° to 16° when the seal ring is formed of Teflon or some similar non-metallic seal material, and the expander ring is formed of steel.

Because the sealing surface on the outer periphery of the seal ring 128 is greater than the sealing surface on either axial side thereof, the seal ring 128 will be maintained continuously in sealing engagement with the surrounding wall 130 of the housing. Thus, the seal ring will not rotate relative to the housing upon rotary relative adjustment of the valve parts and thus will not cause wear on the housing inner wall. If the housing were to be made of aluminum alloy rather than steel, and if the seal ring were of a design that would permit relative movement of the ring relative to the housing, a wear condition would take place which would be detrimental to the operation of the steering valve because effective sealing of the seal assembly would not be possible upon development of a pressure differential across the seal ring in either direction.

In FIG. 6, I have illustrated an alternate embodiment of the invention. In the case of FIG. 6, the seal ring, the valve sleeve and the housing are identified by reference characters corresponding to those used in the FIG. 5 embodiment. The FIG. 6 embodiment, however, has an expander ring 140' on the radially inward side of the seal ring that has a depth greater than the depth of the expander ring 140 of the FIG. 5 embodiment. The ring of FIG. 5 has a greater sealing area at its surface 150 than the corresponding surface area of the FIG. 5 embodiment. As seen in FIG. 6, the expander ring 140' has a conical surface 142' formed at substantially the same cone angle as the surface 142 of the FIG. 5 embodiment. The ring 140' of FIG. 6, in addition to the increased sealing area, has manufacturing advantages because the machining steps necessary to machine the ring 140' would be simplified.

Having described a preferred embodiment of my invention, what I claim and desire to secure to United States Letters Patent is:

1. A seal assembly for sealing a rotary fluid pressure distributor member having a valve sleeve disposed in a housing member and adapted for rotary movement relative thereto about a common axis, said sleeve having a seal ring groove at a location in a plane that is transverse to said axis, said groove having two axially spaced radial sealing wall surfaces, said sealing wall surfaces being opposed and substantially parallel, one with respect to the other;

first and second pressure ports in said sleeve on opposite axial sides of said groove;

said seal assembly including a seal ring with two radially disposed axial sides in said groove with an axial clearance between said seal ring and one of said groove sealing wall surfaces, said seal ring having a radial sealing surface on one axial side thereof, said ring having a cylindrical outer sealing surface in engagement with said housing member, said ring radial sealing surface being adapted to register with one of said groove sealing wall surfaces; and an underseal expander ring in said groove with two axially spaced sides and an outer conical ring surface engageable with said seal ring whereby said expander ring exerts a radial force on said seal ring to maintain said outer sealing surface n engagement with said housing member, said expander ring having a continuous radial sealing surface on one of said axially spaced sides thereof, the engagement of said outer conical ring surface with said inner side of said seal ring being at a location substantially at the radially inward extremity of the other of said axially spaced sides of said seal ring, an axial component of said radial force effecting sealing engagement of said radial seal ring sealing surface with said one of said groove sealing wall surfaces, said one axially spaced side of said expander ring being in sealing relationship with respect to the other of said groove sealing wall surfaces.

2. A seal assembly for sealing a rotary fluid pressure distributor member having a valve sleeve disposed in a housing member and adapted for rotary movement relative thereto about a common axis, said sleeve having a seal ring groove located in a plane that is transverse to said axis, said groove having two axially spaced radial sealing wall surfaces, said sealing wall surfaces being opposed and substantially parallel, one with respect to the other;

first and second pressure ports in said sleeve on opposite axial sides of said groove;

said seal assembly including a seal ring with two radially disposed axial sides in said groove with an axial clearance between said seal ring and one of said groove sealing wall surfaces, said seal ring having a radial sealing surface on one axial side thereof, said ring having a cylindrical outer sealing surface in engagement with said housing member, said ring radial sealing surface being adapted to register with one of said groove sealing wall surfaces; and an underseal expander ring in said groove with two axially spaced sides and an outer conical ring surface engageable with a radial inner side of said seal ring whereby said expander ring exerts a radial force on said seal ring to maintain said outer sealing surface in engagement with said housing member, said expander ring having a continuous radial sealing surface on one of said axially spaced sides thereof, the engagement of said outer conical ring surface with said inner side of said seal ring being at a location substantially at the radially inward extremity of the other of said axially spaced sides of said seal ring, an axial component of said radial force effecting sealing engagement of said radial ring sealing surface with said one of said groove sealing wall surfaces, said one axially spaced side of said expander ring being in sealing relationship with respect to the other of said groove sealing wall surfaces;

the pressure in said ports creating an axial force on said seal ring in one direction when the pressure in one port exceeds the other and creating an axial force on said seal ring in the opposite direction upon a reversal of the relative magnitudes of the pressures in said ports;

said seal ring being adapted to shift axially in said groove in response to a change in the direction of the net pressure forces created by the pressures in said ports as a fluid seal is maintained between said seal ring and said expander ring.

3. A fluid seal assembly for a rotary valve comprising a valve housing having a cylindrical valve opening and a rotary valve sleeve in said valve opening:

a rotary valve element in said valve sleeve, said rotary valve element and said valve sleeve having a common axis, said rotary valve element and said valve sleeve having registering valve lands;

a high pressure port and a low pressure port in fluid communication with said valve lands on opposed axial sides of said seal assembly;

said fluid seal assembly comprising at least one seal groove in said sleeve with two axially spaced radial sealing wall surfaces, said sealing wall surfaces being opposed and substantially parallel, one with respect to the other;

a seal ring of generally rectangular cross section in said groove, said seal ring having two radially disposed axial sides and a cylindrical outer surface in sealing engagement with said housing and being adapted to effect sealing engagement with one of said groove sealing wall surfaces, the axial thickness of said seal ring being less than the axial width of said groove; and an annular expander ring in said groove radially inward of said seal ring, said expander ring having a conical outer ring surface engageable with a radial inner side of said seal ring and a continuous radial sealing surface on one axial side thereof engageable with one of said groove sealing wall surfaces whereby said expander ring exerts a radially outward force on said seal ring;

said sleeve being adapted to rotate relative to said housing as said seal ring remains fixed against rotary motion relative to said housing, said one axial side of said expander ring being in sealing relationship with respect to the other of said groove sealing wall surfaces, the engagement of said conical outer ring surfaces with said inner side of said seal ring being at a location substantially at the radially inward extremity of the other of said axial sides of said seal ring.

4. A seal assembly for use in a rotary power steering valve in a power steering system, said valve comprising an inner valve member connected to a torque input member and a valve sleeve surrounding said inner valve member, said valve sleeve being connected to a steering torque output member, said steering system having a pump, a low-speed pressure delivery passage connecting the pressure output side of said pump with said steering valve sleeve at a first valve location and a high speed pressure delivery passage connecting the pressure output side of said pump with said steering valve sleeve at a second valve location;

a pressure delivery port in said valve sleeve communicating with fluid pressure actuated elements of said steering system;

a seal ring groove in said inner valve member having sealing wall surfaces on each of two axially spaced sides thereof, said sealing wall surfaces being opposed and substantially parallel, one with respect to the other;

said seal assembly including a seal ring of generally rectangular cross-section in said groove, said seal ring having a cylindrical outer surface in sealing engagement with said housing and being adapted to effect sealing engagement with one of said groove sealing wall surfaces, the axial thickness of said seal ring being less than the axial width of said groove; and an annular expander ring in said groove radially inward of said seal ring, said expander ring having two axially spaced side surfaces and a conical outer surface engageable with said seal ring, one of said side surfaces forming a continuous radial sealing surface engageable with one of said groove sealing wall surfaces whereby said expander ring exerts a radially outward force on said seal ring, an axial component of said radially outward force acting in an axial direction on said seal ring to effect sealing engagement of said seal ring with the other of said groove sealing wall surfaces, the engagement of said conical outer ring surface with said seal ring being at a location substantially at the radially inward extremity of the other of said axially spaced sides of said seal ring;

said expander ring establishing a fluid seal at the location of its engagement with said seal ring as said seal ring is shifted in either axial direction in said groove upon a change in the direction of the pressure forces acting thereon due to a pressure differential across said seal ring.

5. The combination as set forth in claim 1 wherein said seal ring is formed of non-metallic sealing material and said expander ring is formed of steel, shifting movement of said seal ring in said groove in response to a change in direction of pressure differential forces acting thereon being accompanied by radial displacement of said expander ring.

6. The combination as set forth in claim 2 wherein said seal ring is formed of non-metallic sealing material and said expander ring is formed of steel, shifting movement of said seal ring in said groove in response to a change in direction of pressure differential forces acting thereon being accompanied by radial displacement of said expander ring.

7. The combination as set forth in claim 3 wherein said seal ring is formed of non-metallic sealing material and said expander ring si formed of steel, shifting movement of said seal ring in said groove in response to a change in direction of pressure differential forces acting thereon being accompanied by radial displacement of said expander ring.

8. The combination as set forth in claim 4 wherein said seal ring is formed of non-metallic sealing material and said expander ring is formed of steel, shifting movement of said seal ring in said groove in response to a change in direction of pressure differential forces acting thereon being accompanied by radial displacement of said expander ring.

* * * * *